United States Patent [19]

Ellis

[11] Patent Number: 4,698,164

[45] Date of Patent: Oct. 6, 1987

[54] FILTER APPARATUS

[75] Inventor: George S. Ellis, Chardon, Ohio

[73] Assignee: Kinetico, Inc., Newbury, Ohio

[21] Appl. No.: 760,251

[22] Filed: Jul. 29, 1985

[51] Int. Cl.⁴ .............................................. B01D 27/02
[52] U.S. Cl. .................................... 210/739; 210/807;
210/87; 210/100; 210/282; 210/444
[58] Field of Search ................. 210/100, 807, 739, 87,
210/88, 129, 133, 143, 282, 443, 444, 446-449

[56] References Cited

U.S. PATENT DOCUMENTS

| | | | |
|---|---|---|---|
| 3,349,914 | 10/1967 | Kudlaty | 210/133 X |
| 3,570,520 | 3/1971 | Sodi | 210/88 X |
| 4,145,285 | 3/1979 | Martin et al. | 210/100 |
| 4,359,384 | 11/1982 | Brane et al. | 210/100 |
| 4,431,533 | 2/1984 | Wrede | 210/87 |
| 4,555,331 | 11/1985 | Thornton et al. | 210/100 X |

Primary Examiner—Tom Wyse

Attorney, Agent, or Firm—Watts, Hoffmann, Fisher & Heinke

[57] ABSTRACT

A filtering apparatus including a fluid monitoring head and a replaceable filter cartridge removably fastened to said head. The cartridge includes a shut off mechanism for interrupting fluid flow through the cartridge when a predetermined quantity of fluid has been treated by the filter. The fluid monitoring head is releasably coupled to the shutoff mechanism when the filter is installed. The shutoff mechanism includes a valve element threadedly carried by a shaft that forms part of a driven member, operatively connected to a drive member forming part of the monitoring head. As the driven member rotates, the valve element is gradually unthreaded until it separates and is driven to a flow interrupting position by a biasing spring. The coupling between the drive and driven members includes apertures on one of the members which are engaged by resilient tongues formed on the other member.

21 Claims, 6 Drawing Figures

FILTER APPARATUS

TECHNICAL FIELD

The present invention relates generally to filtering systems and in particular to a filtering apparatus that includes a replaceable filter element.

BACKGROUND ART

Filters are used in many applications to remove impurities from a fluid. In the case of water treatment, filters are often employed to selectively remove minerals, chemicals, and other materials. Some of these filters, such as carbon filters which are used to improve the taste and odor of water, gradually become exhausted during use. In particular, the activated carbon housed within the filter eventually becomes saturated and can no longer remove the intended impurities. If the filter is not replaced, the water quality degrades. With many, if not most, of these filters, the user does not recognize the need for replacement until the water quality suffers substantially.

DISCLOSURE OF INVENTION

The present invention provides a new and improved filtering apparatus that monitors the water flow through a filter element and automatically terminates the flow of water after a predetermined quantity of water has passed through the filter.

The disclosure of the invention is illustrated in connection with carbon filter. However, it should be understood that the invention is adaptable to a wide variety of filters and should not be limited to a carbon filter.

According to the preferred and illustrated embodiment, the filtering apparatus and system comprises a fluid monitoring head and a replaceable filter element. The monitoring head includes a fluid flow sensing mechanism for measuring the quantity of fluid passed through a replaceable filter element that is releasably coupled to a shutoff mechanism forming part of the filter element when the filter is attached to the water monitoring head. In the disclosed embodiment, the water monitoring head is mounted in the fluid line and includes coupling structure by which the replaceable filter is removably fastened. When the filter is mounted to the head, the flow shutoff mechanism forming part of the filter automatically couples to the fluid sensing mechanism located within the fluid monitoring head.

In accordance with the invention, the shutoff mechanism includes a valve element which is released to close off the flow path through the filter when a predetermined quantity of water has passed through the filter as measured by the fluid monitoring head. Since, in the preferred embodiment, the filter is intended to be a disposable item, the unit is sealed and access to the valve element is prevented; consequently the filter must be replaced to reestablish fluid flow through the system.

The preferred fluid sensing mechanism comprises a turbine disposed in the fluid flow path that is operatively connected to a reduction gear train. The gear train in turn is connected to a drive member forming part of the monitoring head which couples with a driven member forming part of the filter.

In the preferred and illustrated embodiment, the flow through the filter is not reduced as the time for replacement nears. The valve element remains substantially out of the flow path until released by the shutoff mechanism. This feature is achieved in the preferred embodiment, by a driven member that comprises a rotatable stem including structure couplable with the drive member of the fluid monitoring head. The rotatable stem (forming part of the filter) includes a threaded segment which threadedly receives the shutoff valve element. The valve element is threaded onto the segment during assembly of the filter and is located within a valve chamber. The chamber includes structure, preferably spline-like members which engage complemental structure on the shutoff valve for preventing its rotation within the chamber.

When the filter is installed on the monitoring head, the drive member operatively couples with the driven member (in the filter) thus producing rotation in response to rotation of the turbine, as fluid passes through the filter apparatus. As the stem rotates, the valve element is gradually unscrewed until it separates from the stem and is displaced to a position in the valve chamber at which the flow of fluid through the filter is blocked.

According to a feature of the invention, a biasing spring acting between the valve element and the chamber urges the element towards the flow interrupting position in the valve chamber so that the flow is terminated immediately upon separation of the valve element from the driven stem.

In accordance with a feature of the invention, the valve element defines an effective pressure area which is exposed to incoming fluid pressure. The fluid exerts a force on the element urging it towards the flow interrupting position. As a result, the valve element is maintained in the flow interrupting position by both a spring and a fluid generated biasing force.

According to another feature of the invention, the coupling between the drive member in the monitoring head and the driven member in the filter is provided by a plurality of apertures in one of the members which are engageable by a tongue arrangement forming part of the other member. In the preferred and illustrated embodiment, the driven stem includes a pair of tongues which are biased towards engagement with apertures in the drive member. The tongues are formed from a somewhat elastomeric material so that if the tongues and apertures are not aligned when the filter is mounted to the head assembly, the tongues resiliently deform to allow mounting of the filter. Fluid flow through the monitoring head will cause the drive member to rotate relative to the driven member until alignment is achieved whereupon engagement between the tongues and the apertures occurs.

According to still another feature of the invention, the coupling between the monitoring head and the replaceable filter is provided by a thread type structure. The replaceable filter is preferably a molded cartridge supported in a housing which includes molded, internal threads at one end. The monitoring head includes a depending flange defining external threads adapted to receive the threads formed on the housing. With the disclosed construction, replacement of the filter is accomplished quite readily.

Additional features of the invention will become apparent and a fuller understanding obtained by reading the following detailed description made in connection with the accompanying drawings.

BEST MODE FOR CARRYING OUT THE INVENTION

Figure 1:
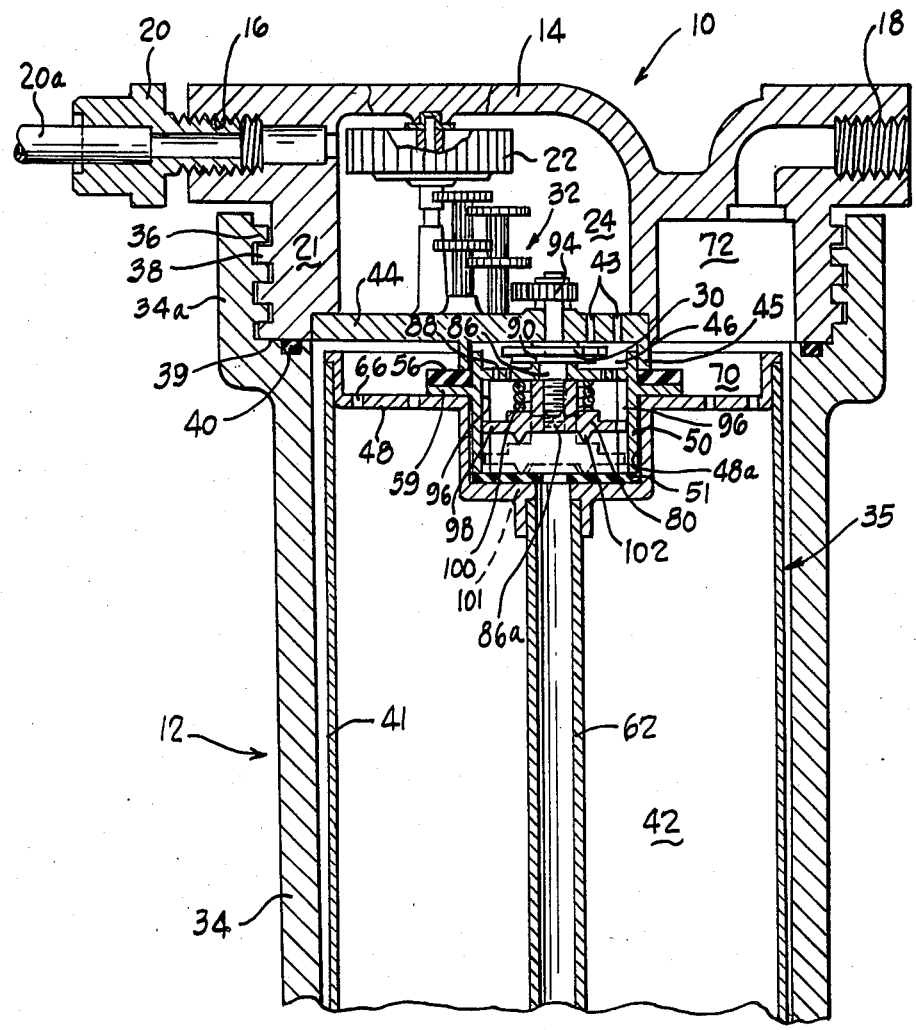
FIG. 1 is a sectional view of a filtering apparatus constructed in accordance with the preferred embodiment of the invention.
Figure 1:
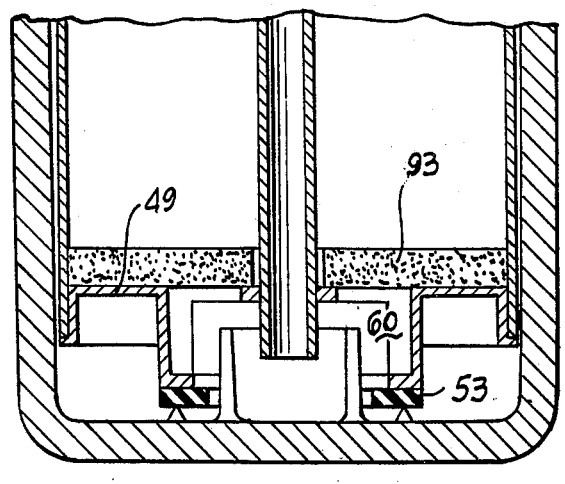

FIG. 1 illustrates the overall construction of a filtering apparatus constructed in accordance with the preferred embodiment of the invention. The apparatus includes a fluid monitoring head 10 and a filter cartridge assembly 12 removably attached to the head. In the disclosed embodiment, the head includes a molded housing 14 defining integral inlet and outlet fittings 16, 18. Each fitting is adapted to receive a fluid coupling such as that indicated by the reference character 20 for connecting a fluid conduit 20a. An annular flange 21 depends downwardly from the bottom of the housing 14.

Figure 2:
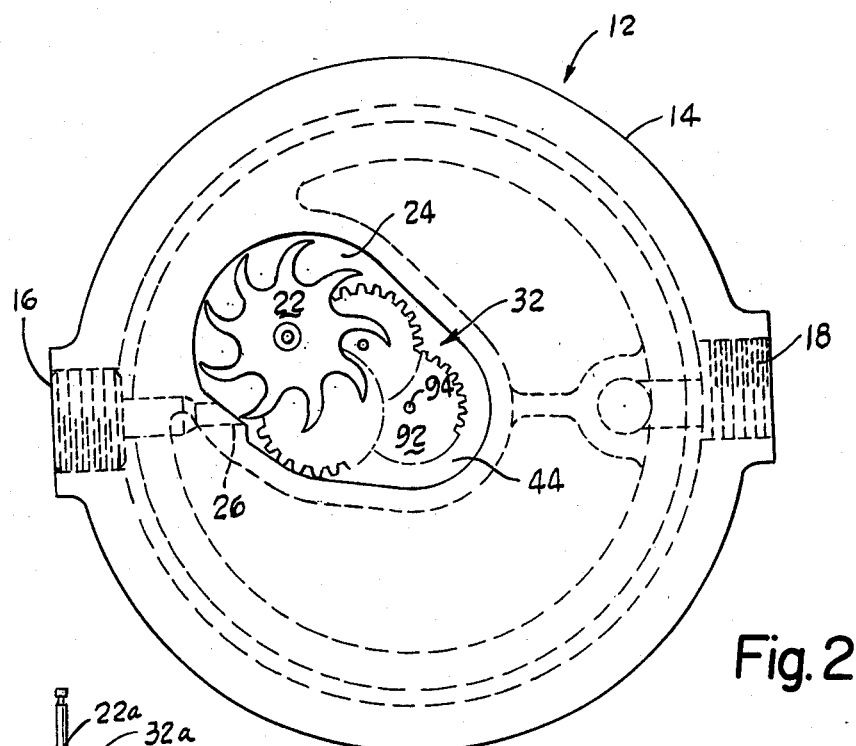
FIG. 2 is a top view of the apparatus shown in FIG. 1.

Although various monitoring arrangements can be employed, in the exemplary embodiment a turbine system is utilized. In particular, a rotatable turbine 22 is rotatably mounted in a fluid receiving chamber 24. The blades of the turbine as seen best in FIG. 2, are positioned so that inlet fluid entering the receiving chamber 24 by way of an inlet nozzle 26 impinges on the blades causing attendant rotation. Rotation of the turbine is transferred to a driver member 30 through a reduction gear train indicated generally by the reference character 32.

In the disclosed embodiment, the filter cartridge assembly 12 includes an external, molded housing 34 that supports and encloses a replaceable filter cartridge 35. An upper section of the housing 34 defines a flange-like structure 34a including molded internal threads 36. Matching external threads 38 are molded in the flange 21 of the monitoring head 10 so that the filter housing 34 can be readily removed and replaced. A housing mounted O-ring seal 40 sealingly engages a bottom surface 39 of the flange 21 and provides a fluid-tight seal between the monitoring head 10 and the filter housing 34. The filter cartridge 35 encloses a filter material 42. Upper and lower filter screens 93 (only the lower screen is shown) inhibit the escape of filter material 42 from the cartridge 35.

The present invention is being disclosed as part of a carbon filter and as such the material 42 would constitute activated carbon, which is known in the industry. It should be understood that the present invention is adaptable to a wide variety of filtering applications and should not be limited to an activated carbon-type filter.

The carbon material 42 is contained within the cartridge 35 by a casing defined in part by a cylindrical section 41 which conforms somewhat to the inside of the cartridge housing 34. A cap or web 48 is fastened to the top of the casing section 41 and defines a cylindrical recess 48a located centrally and preferably axially aligned with the axis of the casing section 41. A base plate 49 encloses the bottom of the casing and also sealingly engages the bottom of the cartridge housing 34 via a seal 53.

Figure 3:
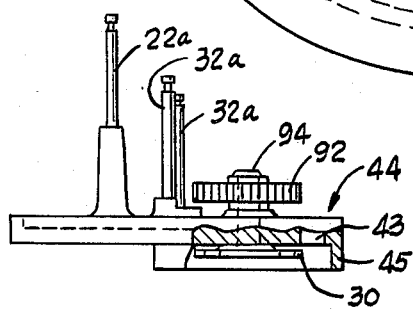
FIG. 3 is an enlarged fragmentary view of a valve mechanism forming part of the filter apparatus.

Fluid, i.e., water enters the cartridge 35 by way of apertures 43 formed in a base plate 44 of the monitoring head 10 which as seen in FIGS. 2 and 3 encloses the bottom of the receiving chamber 24 and also mounts the turbine 22 and associated support shaft 22a and the reduction gear train 32 and associated shafts 32a. A narrow annular flange 45 depends from the bottom of the base plate 44. The water is received in a valve chamber 46 defined generally between the monitoring head 10 and the cartridge 12. In particular, the valve chamber 46 is defined in part by an insert 50 supported within the recess 48a which sealingly engages a seal 51 located at the base of the recess. The seal 51 includes an aperture 52 located centrally with respect to the recess 48a. The insert 50 includes a transverse flange 59 that engages an upper seal 56 that is captured between the transverse flange 59 of the insert 50 and the depending flange 45 forming part of the monitoring head base plate 44. An inlet tube 62 extends downwardly from the recess 48a and opens near the base of the cartridge housing 34. From there the fluid enters the filter cartridge 35 via a passage indicated generally by the reference character 60 defined by the casing base plate 49 and travels upwardly through the filter material 42.

The casing cap or web 48 is apertured (by apertures 66) to allow fluid to proceed into an annular discharge chamber 70 formed between the bottom of the housing 14 and the top of the casing cap 48. The fluid flows from the discharge chamber 70 in the cartridge 35 into an outlet chamber 72 formed in the monitoring head 10. The outlet chamber 72 communicates with the outlet 18.

Figure 5:
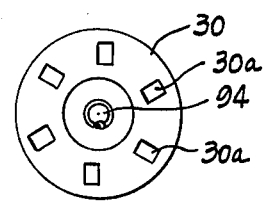
FIG. 5 is a bottom view of a drive member forming part of the valve mechanism as seen from the plane indicated by the line 5—5 in FIG. 3.
Figure 4:
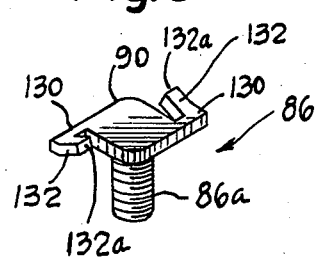
FIG. 4 is a perspective view of a valve keeper forming part of the valve mechanism shown in FIG. 3.
Figure 6:
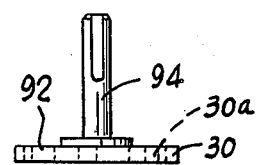
FIG. 6 is a side elevational view of the drive member.

The valve chamber 46 houses a shutoff valve element 80 which operates to block the flow of fluid into the inlet tube 62 after a predetermined amount of fluid has been treated by the filter 35. When the cartridge is initially installed on the monitoring head 10, the shutoff element 80 is threadedly carried by a driven member or valve keeper 86 forming part of the cartridge. The driven member 86 is rotatably supported in an apertured upper wall 88 defined by the valve chamber insert 50. The member 86 includes a threaded stem 86a that threadedly engages a blind, threaded bore in the shutoff valve 80 and a coupling member 90 which operatively engages the drive member 30 forming part of the monitoring head 10. The drive member 30 is operatively connected to the gear reduction transmission 32 by a keyed gear 92 and gear shaft 94 (see FIGS. 3 and 5). It should be apparent that the flow of water into the filter cartridge 12 produces rotation in the turbine which is transmitted (via the gear train 32) as a reduced rotation in the drive member 30. The threads on the stem 86a and shutoff valve element 80 are designed so that the shutoff element is gradually unthreaded from the stem 86a.

To prevent rotation of the shutoff valve element 80 with the stem 86a, the chamber insert 50 includes splines or keys 96 which slidably engage complementally shaped tabs or ears 98 on the shutoff valve element 80. Consequently, the shutoff element can only move axially in the chamber 46. When the stem has rotated a predetermined number of times, determined by the length of the threaded segment 86a, the shutoff valve 80 is released and driven downwardly by a biasing spring 100 to the closed position 101 (shown in phantom). A sealing flange 102 is formed on the bottom of the shutoff valve element 80 and sealingly engages the seal 51, thus preventinng further fluid flow into the inlet tube 62. Once the element 80 is released by the drive stem 86a, the flow of fluid through the filter cartridge 35 is immediately terminated forcing the replacement of the spent cartridge. The disclosed construction is relatively tamper proof so that reuse of the cartridge is prevented. The cartridge is replaced by unscrewing the filter housing 34 from the monitoring head 10 in order to gain access to the replaceable cartridge 35. The spent cartridge is removed from the housing 34 and replaced with a new one. The housing 34 is then screwed onto the head 10. The seals 53, 56 engage associated portions of the filter housing 34 and the cartridge 35 to isolate the various flow paths.

It should be apparent that, with the disclosed configuration, the quantity of fluid treatable by the cartridge 35 before the shutoff valve 80 is released is easily adjusted by a variety of methods. Firstly, the gear ratio between the turbine 22 and the drive member 30 can be modified by changing the size and number of gears. Secondly, the length and/or threaded distance of the valve element on the stem 86a can be modified so that the number of revolutions necessary for the release of the valve is increased or decreased.

Turning now to FIGS. 2 and 3, the method for coupling the cartridge mounted shutoff mechanism with the head mounted fluid monitoring mechanism is illustrated. Since it is difficult to insure the alignment of the driving and driven members 30, 86 when a new cartridge is being installed, a mechanism for accommodating misalignment is provided. In the preferred embodiment, the drive member 30 comprises a disc mounted at the end of the drive shaft 94. The drive disc 30 includes a plurality of apertures 30a arranged symmetrically about the axis of rotation. The cartridge mounted driven member 86 includes the coupling member 90. The coupling member 90 includes a pair of arms 130 that each support an upwardly biased tongue 132. The spacing of tips 132a of the tongues 132 corresponds to the radial distance between opposed pairs of apertures 30a in the drive disc 30. The tongues 132 are resiliently connected to the arms 130 to permit deflection.

In the preferred embodiment, the entire part is molded from a material having some elasticity. When the cartridge 35 is installed onto the mounting head 10, the tips 132a of the tongues 132 contact the underside of the drive disc 30. If the two members are aligned, the tongues 132 enter and engage a pair of apertures 30a in the drive disc 30. If, however, the members are misaligned, the tongues are deflected downwardly upon contact with the drive disc. During the initial operation of the filter, the drive disc 30 rotates relative to the coupling member 90 until a pair of apertures 30a becomes aligned with the tongues 132 whereupon the tongues spring upwardly to engage the apertures thus locking the drive disc 33 with the driven member 86.

With the disclosed arrangement, a simple and effective coupling is provided that allows initial slippage between the members until alignment is achieved. By forming the member from the material having some elasticity, such as plastic, a separate biasing arrangement for the tongues is not needed.

Although the invention has been described with a certain degree of particularity, it should be understood that various changes can be made to those skilled in the art without departing from the spirit or scope of the invention as hereinafter claimed.

I claim:

1. A filter apparatus comprising:
   (a) a fluid monitoring assembly defining an inlet for receiving fluid under pressure;
   (b) a replaceable filter element removably connected to said fluid monitoring assembly and defining a flow path from said inlet to an outlet and further including filtering material for filtering fluid conveyed along said flow path;
   (c) said fluid monitoring assembly including sensing means responsive to fluid flow into said filter element and operative to provide a signal indicative of the quantity of fluid received at said inlet and delivered to said repalceable filter element;
   (d) a valve member forming part of said filter element and movable from a first position in which fluid flow is allowed to flow along said flow path substantially unimpeded and a second position at which fluid flow along said flow path is blocked by said valve member;
   (e) a valve actuating means responsive to said sensing means and operative to cause said valve member to move from said first to said second position upon receiving a predetermined signal from said fluid monitoring assembly;
   (f) means for releasably coupling said valve actuating means with said fluid monitoring assembly.

2. The apparatus of claim 1 wherein said valve actuating means opposes a biasing force on said valve member tending to urge it towards the fluid flow interrupting position and which is operative to release said valve member upon receiving said predetermined signal from said fluid monitoring assembly.

3. An improved carbon filter, comprising:
   (a) a fluid monitoring head defining an inlet for receiving fluid to be filtered and an outlet for discharging filtered fluid;
   (b) a turbine and associated drive train forming part of said monitoring head and operative to produce an output rotation in response to fluid flow into said monitoring head, said drive train including an output drive member;
   (c) a filter cartridge removably connected to said monitoring head and including structure defining a fluid flow path through said cartridge communicating with said inlet and outlet in said monitoring head;
   (d) a valving member forming part of said cartridge shiftable from a first position at which said element is substantially out of said fluid flow path and a flow interrupting position at which said element blocks flow along said flow path;
   (e) a valve member keeper for maintaining said valve member at said first position, said keeper operative to release said valve member upon a predetermined output from said fluid monitoring head.

4. The apparatus of claim 3 wherein said keeper releases said valve element in response to a predetermined number of revolutions of said output drive member.

5. The apparatus of claim 4 wherein said valve keeper threadedly engages said valve member such that rotation of said keeper by said output drive member causes said keeper to unthread itself from said valve member whereby said valve element is released and allowed to shift to the flow interrupting position.

6. The apparatus of claim 5 further including a releasable coupling by which said output drive member drivingly engages said valve keeper when said cartridge is installed on said monitoring head.

7. The apparatus of claim 6 wherein said output drive member includes an apertured disc and said valve keeper includes a coupling member including at least one resiliently biased tongue, engageable with at least one aperture in said disc, said disc confrontingly engaging said coupling member when said cartridge is installed on said monitoring head.

8. The apparatus of claim 5 wherein said valve keeper and valve member are located in a valve chamber defined at least in part by the filter cartridge.

9. The apparatus of claims 8 wherein said valve chamber includes means communicating with a fluid receiving chamber formed in said monitoring head.

10. The apparatus of claim 5 wherein said valve member includes an annular, sealing flange sealingly engageable with a portion of said valve chamber whereby fluid flow out of said valve chamber is inhibited.

11. A method for filtering fluid, comprising the steps of:
(a) providing a fluid monitoring head in communication with a source of fluid to be filtered;
(b) removably attaching a filter element to said head;
(c) monitoring the quantity of fluid conveyed through said filter by a sensing means responsive to fluid flow to said filter element;
(d) terminating fluid flow through said filter by blocking a fluid flow path defined by said filter with a blocking means responsive to said sensing means and forming part of said filter when a predetermined quantity of fluid has been conveyed through said filter as measured by said monitoring head.

12. A filter apparatus comprising:
(a) a fluid monitoring assembly defining an inlet for receiving fluid and operative to provide a signal indicative of the amount of fluid received at said inlet;
(b) a replaceable filter element removably connected to said fluid monitoring assembly, said filter including material for filtering fluid conveyed through said filter element;
(c) a valve member forming part of said filter element, said member movable from a first position at which fluid flow is allowed to flow thorugh said filter element substantially unimpeded and a second position at which fluid flow through said filter element is blocked by said valve member; and
(d) a valve actuating means responsive to said signal provided by said fluid monitoring assembly and operative to cause said valve member to move from said first to said second position upon receiving a signal indicating that a predetermined quantity of fluid has been treated by said filter element as measured by said fluid monitoring assembly.

13. The apparatus of claim 12 wherein said valve actuating means causes said valve member to move from said first position towards said second position in response to a signal from said fluid monitoring assembly indicating that fluid is flowing through said filter element.

14. The apparatus of claim 12 wherein said valve actuating means includes a first threaded structure engageable with a second threaded structure forming part of said valve member, said first and second threaded structures threadedly engage when said valve member is at said first position and said structures being disengaged when said valve member is at said second position.

15. An improved carbon filter, comprising:
(a) a fluid monitoring head defining an inlet for receiving fluid to be filtered and an outlet for discharging filtered fluid;
(b) said fluid monitoring head including a fluid flow sensing mechanism including an output drive member rotatable in response to fluid flow between said inlet and said outlet;
(c) a filter cartridge removably connected to said monitoring head and including structure defining a fluid flow path through said cartridge communicating with said inlet and outlet in said monitoring head;
(d) a valving member forming part of said cartridge, shiftable from a first position at which said member is substantially out of said fluid flow path and a flow interrupting position at which said member inhibits flow along said flow path;
(e) a valve member keeper for maintaining said valve member at said first position, said keeper operative to release said valve member upon a predetermined number of rotations of said output drive member.

16. The apparatus of claim 15 wherein said mechanism comprises a turbine and associated drive train, said turbine disposed in a flow path such that fluid flow in said monitoring head produces attended rotation in said turbine.

17. An improved carbon filter assembly, comprising:
(a) a fluid monitoring head defining an inlet for receiving fluid to be filtered and an outlet for discharging filtered fluid;
(b) a turbine and associated drive train forming part of said monitoring head and operative to produce an output rotation in response to fluid flow into said monitoring head, said drive train including an output drive member;
(c) a filter element forming part of said assembly and including structure defining a fluid flow path through said filter element communicating with said inlet and outlet in said monitoring head;
(d) a valving member forming part of said filter assembly shiftable from a first position at which said member is substantially out of said fluid flow path and a flow interrupting position at which said member blocks flow along said flow path;
(e) a valve member keeper for maintaining said valve member at said first position, said keeper operative to release said valve member upon a predetermined output from said fluid monitoring head.

18. An improved carbon filter assembly, comprising:
(a) a fluid monitoring head defining an inlet for receiving fluid to be filtered and an outlet for discharging filtered fluid;
(b) said fluid monitoring head including a fluid flow sensing mechanism including an output drive member rotatable in response to fluid flow between said inlet and said outlet;
(c) a filter element forming part of said assembly and including structure defining a fluid flow path through said filter element communicating with said inlet and outlet in said monitoring head;
(d) a valving member forming part of said assembly, shiftable from a first position at which said member is substantially out of said fluid flow path and a flow interrupting position at which said member inhibits flow along said flow path;

(e) a valve member keeper for maintaining said valve member at said first position, said keeper operative to release said valve member upon a predetermined number of rotations of said output drive member.

19. A filter apparatus comprising:
(a) a fluid monitoring and filter assembly defining an inlet for receiving fluid under pressure;
(b) a filter element forming part of said fluid monitoring and filter assembly and defining a flow path from said inlet to an outlet and further including filtering material for filtering fluid conveyed along said flow path;
(c) said assembly including sensing means responsive to fluid flow into said filter element and operative to provide a signal indicative of the quantity of fluid received at said inlet and delivered to said filter element;
(d) a valve member forming part of said assembly and movable from a first position in which fluid flow is allowed to flow along said flow path substantially unimpeded and a second position at which fluid flow along said flow path is blocked by said valve member;
(e) a valve actuating means responsive to said sensing means and operative to cause said valve member to move from said first to said second position upon receiving a predetermined signal from said sensing means.

20. The filter apparatus of claim 19 wherein said filter element is removably connected to said assembly.

21. The filter apparatus of claim 19 wherein said sensing means including a fluid driven turbine which is operatively connected to said valve actuating means.

* * * * *